(No Model.)

C. HIGHAM.
CAR BRAKE.

No. 252,662.  Patented Jan. 24, 1882.

Witnesses.
John F. C. Brinkert
W. H. Sigston.

Inventor
Charles Higham
by Crosby & Gregory
Attys

UNITED STATES PATENT OFFICE.

CHARLES HIGHAM, OF WATERTOWN, NEW YORK.

CAR-BRAKE.

SPECIFICATION forming part of Letters Patent No. 252,662, dated January 24, 1882.

Application filed November 23, 1881. (No model.)

*To all whom it may concern:*

Be it known that I, CHARLES HIGHAM, of Watertown, Jefferson county, State of New York, have invented an Improvement in Car-Brakes, of which the following description, in connection with the accompanying drawings, is a specification.

This invention relates to car-brakes, and has for its object to enable the connecting mechanism between the brake-shoes and the part to which the actuating power is applied to be readily and conveniently adjusted for wear, so that the same range of movement of the actuating part—such, for instance, as the piston of an atmospheric brake—will always produce substantially the same effect upon the brake-shoes.

The invention consists essentially in providing one of the links by which the arms of the usual levers are connected, with a movable bearing-block for one of the said arms, and with an adjusting device by which the said bearing-block may be moved longitudinally in or on the link to vary its effective length, and thus compensate for wear.

Figure 1:
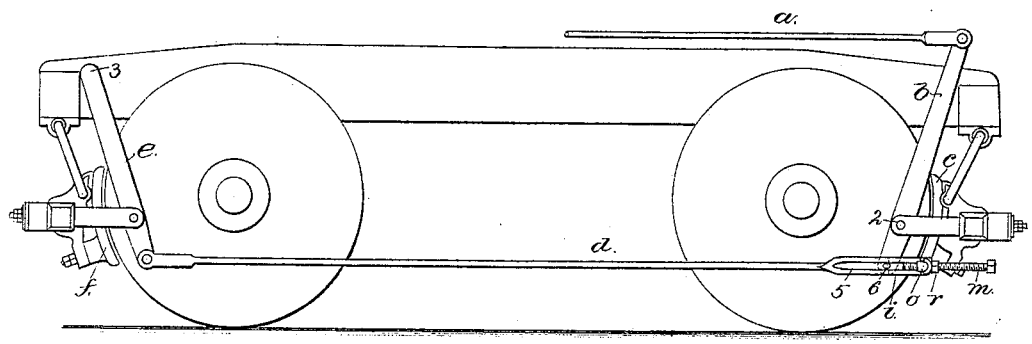
Figure 2:
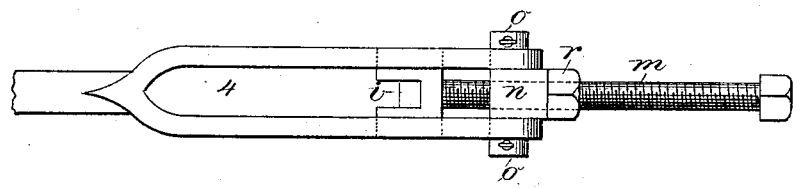

Figure 1 is a side elevation of a car-truck provided with my invention, and Fig. 2 an enlarged top view of the end of the link provided with the movable bearing-block and its adjusting device.

The power is applied to the link $a$ in any usual manner—for example, from the piston of an atmospheric-brake cylinder or a capstan operated by hand. The said link $a$ is connected with one arm of a lever, $b$, having its fulcrum 2 connected with the brake-shoe $c$, and its other arm connected by a link, $d$, with another lever, $e$, fulcrumed at 3 on the frame-work of the truck, and connected with the brake-shoe $f$, so that when a force is applied to the link $a$ both brake-shoes $c$ and $f$ are pressed against the wheels simultaneously in the usual manner. When the brake-shoes become worn the same range of movement of the link $a$ will not produce as great an amount of pressure between the shoes and wheels as before such wear took place, which causes inconvenience when the range of movement of the actuating part is limited, as is the case with a piston moving in a cylinder.

In order to obviate this inconvenience, one of the links—as, for example, the one marked $d$—is made adjustable in its effective length or distance between the points of connection of the levers, as follows: The end of the link $d$, connected with the lever $b$, is forked, as shown at 4, Fig. 2, to embrace the end of the said lever, and each portion of the fork is slotted, as shown at 5, Fig. 1, to receive a guide-pin, 6, fixed in the end of the lever $b$. A bearing-block, $i$, suitably recessed to receive the end of the lever $b$ and its pin 6, is guided in the said slots 5, and may be moved longitudinally therein by a set-screw, $m$, working in a threaded socket, $n$, having lugs $o$, that engage the ends of the slots 5, and thus afford a bearing for the said socket. A check-nut, $r$, serves to retain the screw $m$ in the desired position. By turning the screw $m$ into its socket the bearing block $i$ and end of the lever $b$ are brought nearer to the end of the lever $e$, and the faces of the brake-shoes brought nearer to the wheels independently of the movement of the link $a$, so that by adjusting the said screw as the parts wear away the proper relation between the wheels, brake-shoes, and their actuating part may be maintained.

I claim—

1. The brake-shoes and their operating-levers and a link pivoted at one end to one of the said levers, combined with a movable bearing-block for the other lever mounted in the other end of the said link, and means to adjust its position in said link, substantially as described.

2. The lever and link forked to embrace it and slotted at its end, as described, combined with the bearing-block guided in the said slots, and its adjusting set-screw and threaded socket therefor, held in the end of the said slots, substantially as set forth.

In testimony whereof I have signed my name to this specification in the presence of two subscribing witnesses.

CHARLES HIGHAM.

Witnesses:
E. S. BOYNTON,
R. T. ELLICOTT.